(12) United States Patent  
Chen

(10) Patent No.: US 8,128,109 B2  
(45) Date of Patent: Mar. 6, 2012

(54) SIDE MOVEMENT PROPELLED RECREATIONAL DEVICE HAVING EXTENDED REAR SUPPORT

(76) Inventor: Shane Chen, Camas, WA (US)

( * ) Notice: Subject to any disclaimer, the term of this patent is extended or adjusted under 35 U.S.C. 154(b) by 0 days.

(21) Appl. No.: 12/932,985

(22) Filed: Mar. 9, 2011

(65) Prior Publication Data

US 2011/0227305 A1   Sep. 22, 2011

Related U.S. Application Data

(63) Continuation of application No. 12/689,205, filed on Jan. 18, 2010, now Pat. No. 7,926,825, which is a continuation of application No. 11/525,537, filed on Sep. 21, 2006, now Pat. No. 7,681,895.

(60) Provisional application No. 60/760,638, filed on Jan. 21, 2006.

(51) Int. Cl.
*B62M 1/00* (2010.01)
*B62D 61/06* (2006.01)
*B62B 3/00* (2006.01)

(52) U.S. Cl. ........... 280/87.043; 280/87.041; 280/47.11; 280/62

(58) Field of Classification Search ............. 280/87.041, 280/87.01, 62, 87.03, 87.021, 23.1, 32.6, 280/87.042, 87.043, 47.11  
See application file for complete search history.

(56) References Cited

U.S. PATENT DOCUMENTS

| | | | | |
|---|---|---|---|---|
| 4,540,192 | A | * | 9/1985 | Shelton ........................ 280/282 |
| 4,776,604 | A | * | 10/1988 | Valdez et al. ............. 280/87.041 |
| D444,184 | S | * | 6/2001 | Kettler ......................... D21/423 |
| 6,467,781 | B1 | * | 10/2002 | Feng .......................... 280/87.01 |
| 6,719,310 | B1 | * | 4/2004 | Lin ........................... 280/87.041 |
| 2002/0140193 | A1 | * | 10/2002 | Chai ......................... 280/87.041 |
| 2004/0032105 | A1 | * | 2/2004 | Tsai ......................... 280/87.041 |

* cited by examiner

*Primary Examiner* — J. Allen Shriver, II  
*Assistant Examiner* — John R Olszewski  
(74) *Attorney, Agent, or Firm* — Steven J. Adamson

(57) ABSTRACT

A scooter device propelled by side to side movement of a user that includes a frame structure through which at least a front wheel is coupled to two direction biased rear wheels. The biased direction wheels include tilted caster and spring biased caster arrangements. The frame structure may have a rear support member or structure that extends between the two rear wheels. A user support platform of various configurations may be provided with the rear support member or structure. The scooter may have a three wheel configuration with the front wheel being larger than the rear two wheels.

19 Claims, 4 Drawing Sheets

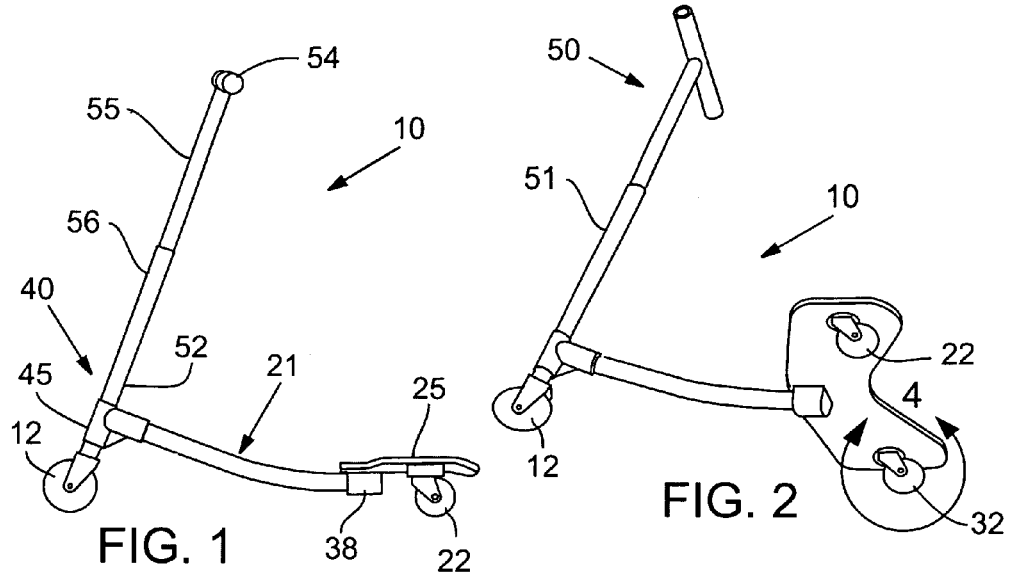
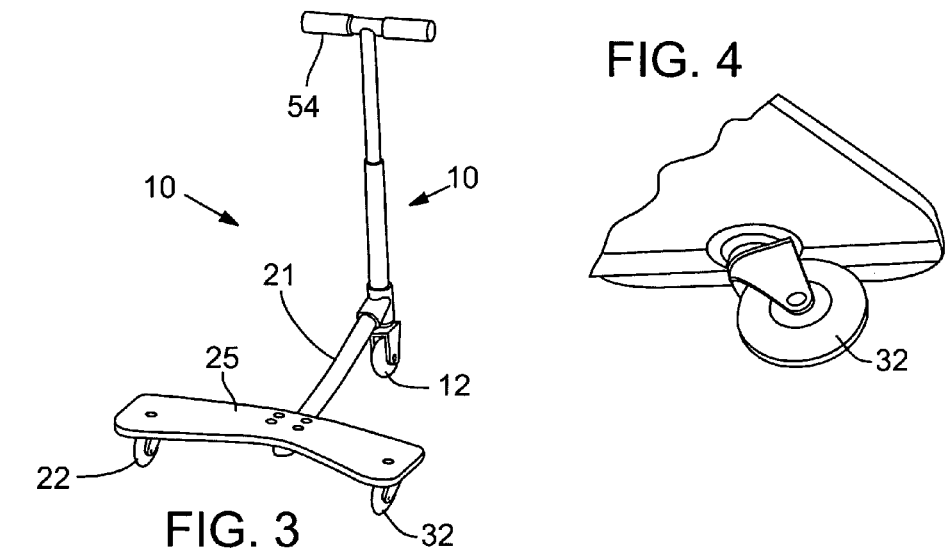

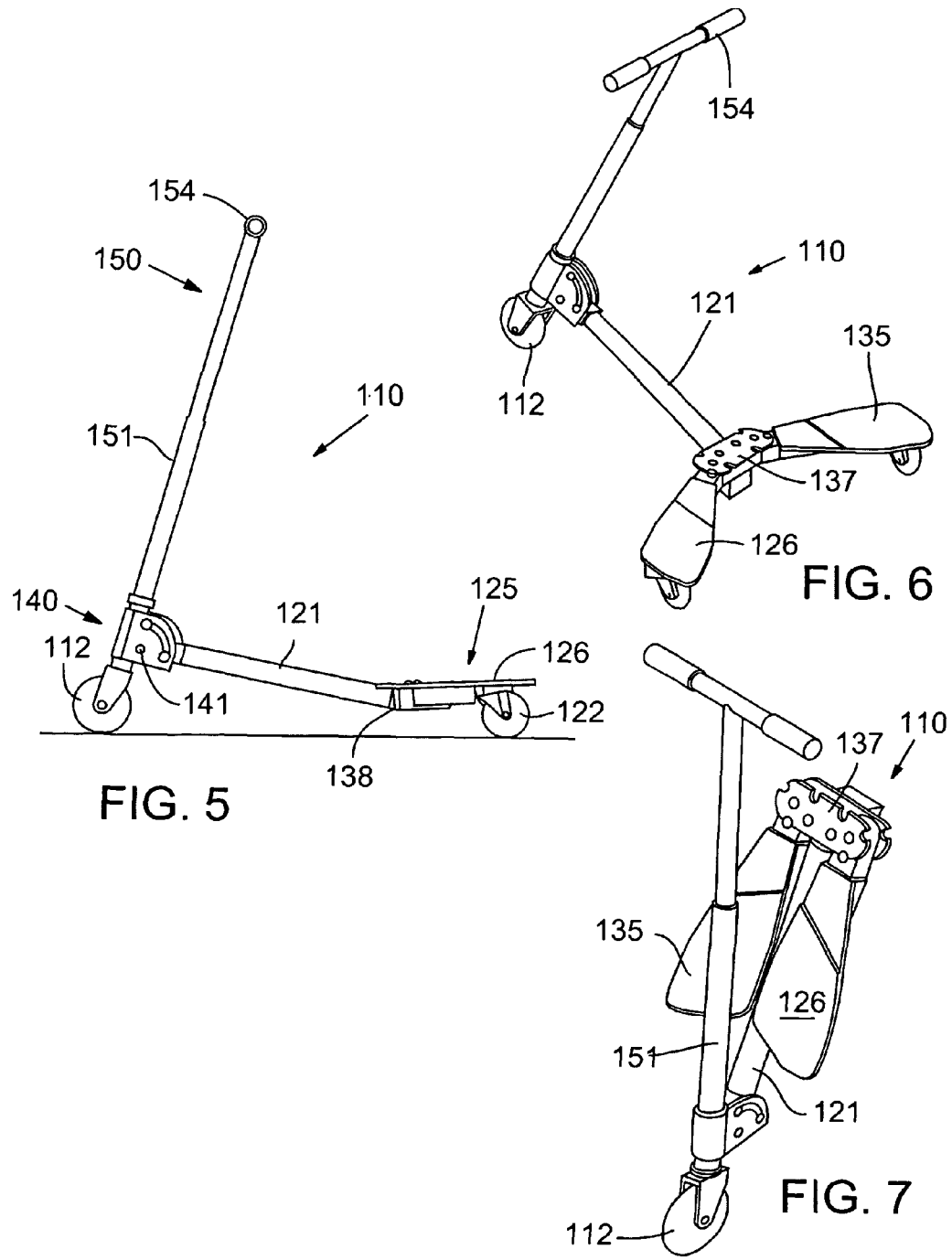

SIDE MOVEMENT PROPELLED RECREATIONAL DEVICE HAVING EXTENDED REAR SUPPORT

CROSS REFERENCE TO RELATED APPLICATIONS

This application is a continuation of U.S. patent application Ser. No. 12/689,205, filed Jan. 18, 2010, now U.S. Pat. No. 7,926,825 entitled Sideways Movement Propelled Scooter Device With Foot Platform and having the same inventor as above (the '537 application).

Application Ser. No. 12/689,205 is a continuation of U.S. patent application Ser. No. 11/525,537, filed Sep. 21, 2006, entitled Sideways Movement Propelled Scooter Device Having Expanded Foot Platform and having the same inventor as above (the '537 application), now issued as U.S. Pat. No. 7,681,895.

This application claims the benefit of U.S. Provisional Application No. 60/760,638, filed Jan. 21, 2006, and entitled Side Movement Propelled Wheeled Recreational Device and having the same inventor as above.

FIELD OF THE INVENTION

The present invention relates to scooters and like devices and, more specifically, to those having three or more wheels and which may be propelled by sideways movement of the user.

BACKGROUND OF THE INVENTION

Various self-propelled and motorized scooters and tricycles are known in the art. These include two wheeled, three wheeled and other multi-wheeled embodiments.

Known three wheeled scooter embodiments include those disclosed in: U.S. Pat. No. 4,540,192, issued to Shelton for a Three-Wheeled Scooter-Type Vehicle ('192 patent); U.S. Pat. No. 5,039,121, issued to Holter for a Tri-Skater ('121 patent); U.S. Pat. No. 6,908,090, issued to Chuang for a Cambering Vehicle Having Inclined Pivot Axle ('090 patent); and U.S. Pat. No. 6,976,687 for a Cambering Vehicle and Mechanism ('687 patent).

The '192 patent discloses a scooter having two rear wheel frame members, each with a narrow foot placement area, that can be moved between a first adjacent position and a second spaced position. The two rear wheels are each mounted with a spring that biases them in the line of direction of their respective frame members. The bias arrangement also allows movement of the wheels out of this line of direction, while returning them in the absence of a displacement force. This arrangement permits forward movement of the scooter when the user shifts his or her weight from side to side.

The '121 patent discloses a scooter device similarly possessing narrow foot placement platforms, yet with tilted caster rear wheels instead of spring biased rear wheels. This "tilted caster" arrangement has an effect similar to that of the '192 patent, biasing the wheels in the line of direction of the frame member (if aligned therewith) and permitting forward propulsion of the scooter device in response to side to side movement of the user.

The '090 patent discloses a scooter device that possesses narrow foot placement platforms and does not utilize spring biased or tilted caster rear wheels. The '090 patent does disclose a scooter device that has a tiltable frame. The tiltable frame permits the steering assembly and wheels to tilt slightly, in parallel, permitting a user to lean the scooter into a turn, etc., thereby enhancing the riding experience.

The '687 patent also discloses a scooter device having narrow foot placement platforms. The '687 patent discloses a scooter device that uses a yoke and linkage arrangement that permits the steering mechanism and wheels to tilt in parallel, permitting a user to lean the scooter into a turn, etc. In the '687 patent, the rear wheels are fixedly mounted in place and the frame is configured such that there is no independent movement of the position of the rear wheels.

The prior art also includes tricycles and like devices that may have a front wheel, a pair of rear wheels, a seat, and a rear platform or frame member that extends between the rear wheels and provides enhanced structural connection between the rear wheels.

The scooter devices of the prior art are disadvantageous because they teach narrow (from a lateral or side-to-side perspective) foot placement platforms that do not give a user more space to move sideways and/or to more casually or carelessly place their feet (or to welcome additional riders or perform stunts, etc.). Scooter devices of the prior art are also disadvantageous in that they do not provide this or like features in a scooter device with biased direction wheels and/or tiltability of the steering mechanism or frame to enhance performance, etc. The prior art is also disadvantageous in not teaching a scooter device that may be folded or otherwise made more compact for storage or transport.

SUMMARY OF THE INVENTION

Accordingly, it is an object of the present invention to provide a side-to-side movement propelled scooter device that overcomes the disadvantageous aspects of the prior art.

It is another object of the present invention to provide such a scooter device that has a laterally extending rear support between the two rear wheels.

It is yet another object of the present invention to provide such a scooter device that has biased direction mounted rear wheels.

These and related objects of the present invention are achieved by use of a side movement propelled recreational device having laterally expanded rear support as described herein.

In one embodiment, a scooter device of the present invention may include at least a first forward located wheel and a second and a third rearward located wheel, the second and third rearward located wheels are mounted in a biased direction arrangement; a frame structure through which the first wheel is coupled to the second and third wheels, the frame structure including a principal longitudinal frame member and a rear support structure or member coupled between the second and third wheels; and a steering mechanism that has a vertically ascending control member and is coupled to the first wheel such that turning of the steering mechanism achieves a turning of the first wheel.

The rear support structure or member may extend laterally from the frame member to the second and third wheels. A user platform may extend above the rear support. The first wheel may be larger than the second and third wheels.

Various other inventive aspects are provided within the present invention as discussed below and indicated in the claims.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1-3 illustrate a side elevation, a bottom perspective, and a rear perspective view of a recreational scooter device in accordance with the present invention.

FIG. 4 is a bottom perspective view that illustrates a rear wheel of the scooter device of FIGS. 1-3 mounted in a forward tilted caster arrangement.

FIGS. 5-7 illustrate a side elevation view, a top perspective view and a front perspective view (in a folded position) of another embodiment of a scooter device in accordance with the present invention.

DETAILED DESCRIPTION

Figure 8:
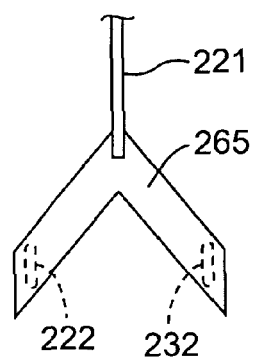
FIGS. 8-10 are top plan views of the rear portion of three other embodiments of a'scooter device, illustrating different user platforms in accordance with the present invention.

Referring to FIGS. 1-3, a side elevation, a bottom perspective, and a rear perspective view of a tricycle scooter device in accordance with the present invention are respectively shown. The scooter device 10 may include a frame structure 20 that is coupled to a steering mechanism 50 and supports at least a front wheel 12 and at least two rear wheels 22,32. Frame structure 20 may include a joint structure 40 from which a substantially longitudinally disposed (i.e., line of direction) support extends. In the embodiment of FIGS. 1-3, the longitudinally disposed support is configured as a single support arm 21 though it may be configured as multiple support arms or other structure that connects to and extends between the steering mechanism and the rear support platform. Support arm 21 may be non-movably coupled to steering mechanism 50 (shown in FIGS. 1-3) or movably coupled through pivot 41 (shown in FIGS. 5-6) or otherwise coupled.

Joint structure 40 may also include a cylindrical shell 45 or the like through which shaft 52 of steering mechanism 50 may extend. Steering shaft 52 may couple to wheel 12 on one end and ascend vertically to a handlebar 54 at its other end. It may include multiple (telescoping or otherwise configured) sections 55,56 and a height adjustment mechanism (not shown but known in the art).

Scooter device 10 may have a user platform 25 that is coupled to and may be positioned substantially perpendicularly to support arm 21. Platform 25 of FIGS. 1-3 preferably extends between the rear wheels 22,32 and provides supported "standing space" for a user. Platform 25 provides a surface that permits a user to place their feet, ride on one side or the other, invite other riders, and perform stunts.

Support arm 21 may be fixedly coupled to rear support platform 25 or through a biased cam 38 or the like that permits movement of the support arm relative to the platform. The biased cam permits movement in response to physical stress, but return to an initial position in the absence of the displacement stress. Since the support arm is coupled to the steering mechanism, a biased cam or like arrangement permits the steering mechanism to tilt relative to the platform, permitting, for example a user to lean the steering mechanism into a turn, etc.

Alternatively, forming all or a section of support arm 21 of a rigid yet flexible material (elastic properties), such as fiberglass or flexible metal or polyurethane or the like permits the steering mechanism to move relative to the platform, for example, permitting a user to lean the steering mechanism into a curve.

The provision of support platform 25 with support arm 21 (as shown in FIGS. 1-3) generally forms the letter "T" or a broad "Y" when viewed from above. The platform may have different configurations including being round, rectangular, elliptical, or amorphous, etc., without departing from the present invention. It can also be seen in FIG. 1 that the front wheel is larger than the rear two wheels.

FIG. 4 illustrates rear wheel 22 (or 32) mounted in a forward tilted caster arrangement. This arrangement achieves a wheel that is capable of turning via rotation about its mounting shaft, yet which self-returns to the line of direction at which it is mounted. Self-returning wheels of this type or a spring bias type are known in the art.

Referring to FIGS. 5-7, a side elevation view, a top perspective view and a front perspective view (in a folded position) of another embodiment of a scooter device 110 in accordance with the present invention are respectively shown.

Scooter device 110 may include many of the features of scooter device 10 and other scooter devices described herein. For example, device 110 may include a steering mechanism 150 with a shaft 151 and handle bar 154, a front wheel 112 and two rear wheels 122,132, a support arm 121 that extends to a user support platform 125 and a biased cam or the like 138 that provides a flexible coupling of the platform to the support arm. Rear wheels 122,132 are preferably mounted through tilted casters or the like to the rear support 125 as discussed elsewhere herein.

The rear support platform 125 may include two foot placement sections 126,135 respectively supporting rear wheels 122,132. These foot placement sections 126,135 may be pivotally coupled to a central mount structure 137, configured to permit release and folding into the position indicated in FIG. 7. Support arm 121 may be pivotally coupled to steering mechanism 150 at joint structure 140 and folded via releasable pivot 141 into the folded position indicated in FIG. 7.

Figure 9:
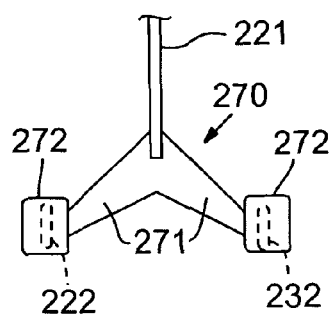
Figure 10:
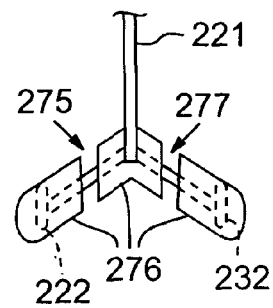

Referring to FIGS. 8-10, top plan views of the rear portion of three other embodiments of a scooter device, illustrating different user platforms, in accordance with the present invention are respectively shown. FIG. 8 illustrates a support platform or member 265 extending from support arm 221 and wheels 222,232 in phantom lines under the platform. Platform 265 is similar to platform 25,125, yet has more of a V-shape, the specific embodiment of FIG. 8 resembling two symmetrical (about a longitudinal axis) polygons or a boomerang in shape.

FIG. 9 illustrates a rear support platform or member 270 having similar shape, yet with a wider V-shape and tapering sections 271 that lead to larger foot placement regions 272 towards the periphery. FIG. 10 illustrates a platform 275 having multiple sections 276 mounted on a laterally extending rear support member 277. In aggregate, these sections constitute a substantially continuous platform extending from above one rear wheel to above the other. FIG. 10 illustrates a central platform section and two peripheral platform sections.

Figure 11:
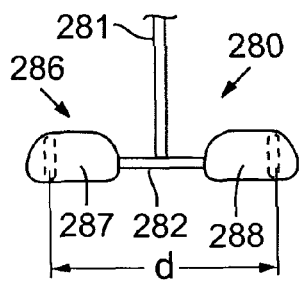
FIGS. 11-13 are top plan views of the rear portion of three other embodiments of a scooter device, illustrating different frame arrangements and user platforms in accordance with the present invention.
Figure 12:
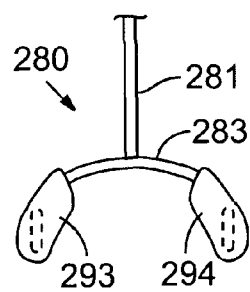
Figure 13:
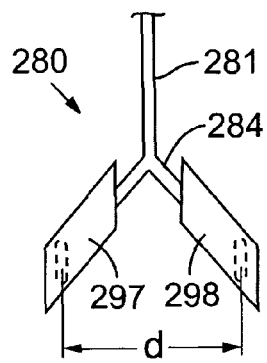

Referring to FIGS. 11-13, top plan views of the rear portion of three other embodiments of a scooter device, illustrating different frame arrangements and user platforms, in accordance with the present invention are respectively shown. FIG.

11 illustrates a frame structure 280 that includes a principal longitudinally disposed support arm 281 (similar to support arm 221) and a laterally extending rear support structure or member that may be straight 282, U-shaped (curved) 283, V-shaped 284 (FIGS. 11-13, respectively) or otherwise configured.

In FIG. 11, the user platform 286 is provided in two elongated sections 287,288 that extend towards each other. FIGS. 12-13 also illustrate platforms with elongated sections 293, 294 and 297,298, respectively. If the rear wheels are spaced by a distance, d, the combined length of the elongated platform sections, in a lateral dimension substantially perpendicular to the longitudinal line-of-direction of the scooter device, is preferably ½ or more of distance d and, in some embodiments, approximately ⅔ or more of distance d.

Figure 14:
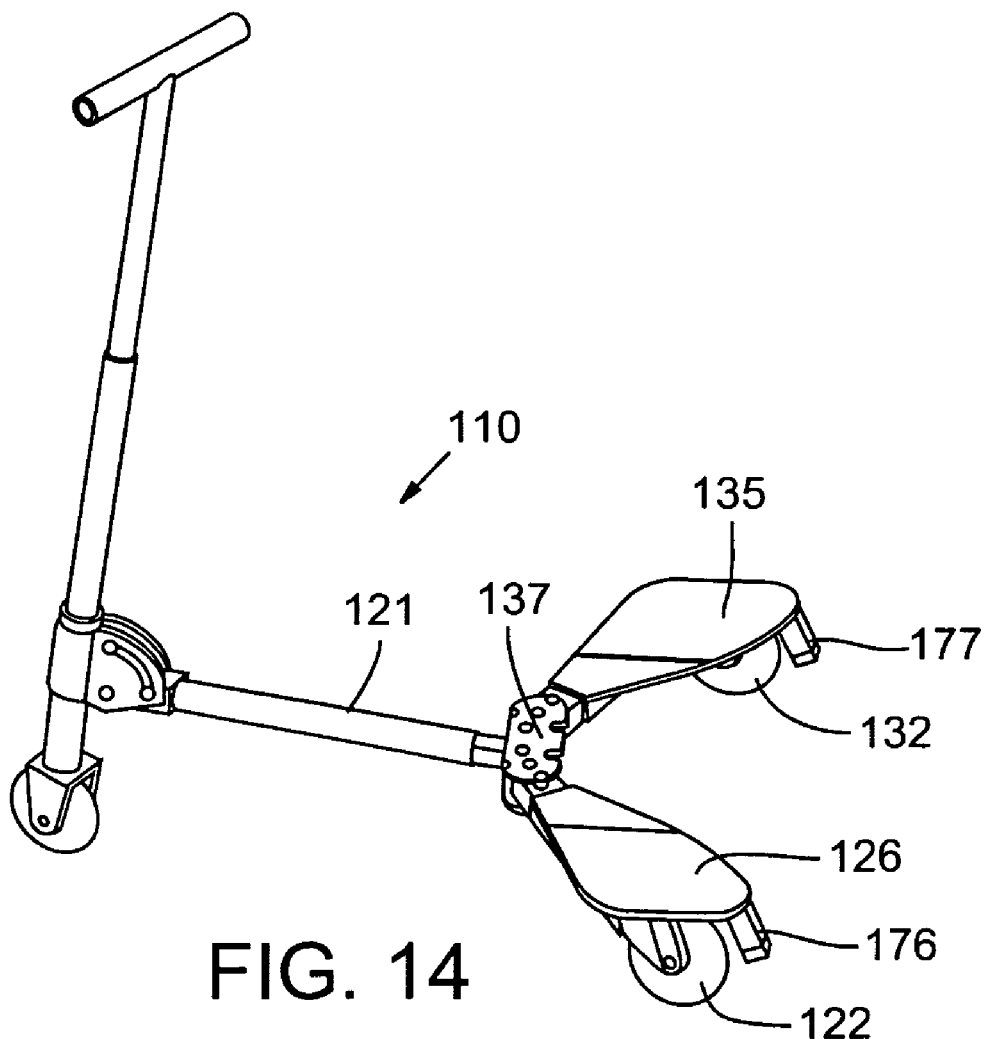
FIG. 14 is a perspective view of the scooter device of FIGS. 5-7 with a braking arrangement in accordance with the present invention is shown.

Referring to FIG. 14, a perspective view of scooter device 110 of FIGS. 5-7 with a braking arrangement in accordance with the present invention is shown. In the device of FIG. 14, the central mount structure 137 may be coupled to support arm 121 such that the mount structure 137 and platform section 126,135 rotate or pivot downward relative to support arm 121 when a user leans backwards on the platform (the mount structure may be biased towards an initial position). Stated otherwise, the mount structure and/or platform sections may be configured such that when a user leans on the rear portions of the platform sections, over brake extension 176,177, the platform sections pivot downward from the mount structure permitting the brake extensions to contact the ground, thereby braking the scooter device.

With respect to materials, the various components of the scooter device may be made with known materials. The frame is preferably made of a lightweight rigid, durable material such as a aluminum or other metal or alloys thereof. A flexible frame member may be made of fiberglass, a flexible metal or other. Platforms may be made of metal, plastic or of the same material used to make skateboard platforms, among other materials.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A scooter device propelled by side to side movement of a user, comprising:
   at least a first forward located wheel;
   at least a second and a third rearward located wheel, the second and third rearward located wheels mounted in a biased direction arrangement;
   a frame structure through which the first wheel is coupled to the second and third wheels, the frame structure including a rear support member extending substantially continuously between the second and third wheels; and
   a shaped human support platform coupled to and extending above the rear support member, the human support platform being positioned above a central portion of the rear support member; and
   a steering mechanism that has a vertically ascending control member and is coupled to the first wheel such that turning of the steering mechanism achieves a turning of the first wheel;
   wherein the rear support member includes a second wheel support section that extends toward the second wheel and a third wheel support section that extends toward the third wheel, each of the second wheel support section and the third wheel support section having a lateral dimension that is greater than its longitudinal dimension.

2. The scooter device of claim 1, wherein the rear support member is positioned substantially above the second and third wheels.

3. The scooter device of claim 1, wherein the steering mechanism and first wheel are arranged such that for steering purposes there is a singular front wheel which is the first wheel.

4. The scooter device of claim 3, wherein the frame structure includes a principal longitudinal frame member that extends rearward of the steering mechanism and, during use, is fixedly and non-movably coupled to the rear support member.

5. The scooter device of claim 1, wherein the frame structure includes a principal longitudinal frame member and the rear support member is arranged substantially perpendicularly to the longitudinal axis of the principal longitudinal frame member.

6. The scooter device of claim 1, wherein the front wheel is larger than the second or third wheel.

7. The scooter device of claim 1, further including a brake.

8. The scooter device of claim 1, wherein the biased direction arrangement includes at least one of a forward tilted caster arrangement and a spring biased caster arrangement.

9. A scooter device propelled by side to side movement of user, comprising:
   at least a first forward located wheel;
   at least a second and a third rearward located wheel, the second and third rearward located wheels mounted in a biased direction arrangement;
   a frame structure through which the first wheel is coupled to the second and third wheels, the frame structure including a principal longitudinal frame member and a principal rear support member that extends substantially outwardly from the frame member to the second and third wheels;
   a steering mechanism that has a vertically ascending control member and is coupled to the first wheel such that a turning of the steering mechanism achieves a turning of the first wheel; and
   wherein the rear support member includes a second wheel support section that extends from the frame member toward the second wheel and a third wheel support section that extends from the frame member toward the third wheel, each of the second wheel support section and the third wheel support section having a lateral dimension that is greater than its longitudinal dimension;
   wherein the steering mechanism and first wheel are arranged such that for steering purposes there is a singular front wheel which is the first wheel; and
   wherein, during use, the rear support member is fixedly coupled to the longitudinal frame member such that the rear support member does not move relative to the longitudinal frame member.

10. The device of claim 9, further comprising a shaped user support platform provided with the rear support member, the platform positioned at least in part above a central portion of the rear support member.

11. The device of claim 10, wherein the rear support member is provided substantially above the second and third wheels and the platform extends above the rear support member.

12. The scooter device of claim 9, wherein the rear support member is arranged substantially perpendicularly to the longitudinal axis of the principal longitudinal frame member.

13. The scooter device of claim 9, wherein the front wheel is larger than the second or third wheel.

14. The scooter device of claim 9, wherein the biased direction arrangement includes at least one of a forward tilted caster arrangement and a spring biased caster arrangement.

15. The scooter device of claim 9, wherein the rear support member is arranged substantially perpendicularly to the longitudinal axis of the principal longitudinal frame member.

16. A scooter device propelled by side to side movement of user, comprising:
   at least a first forward located wheel;
   at least a second and a third rearward located wheel, the second and third rearward located wheels mounted in a biased direction arrangement;
   a frame structure through which the first wheel is coupled to the second and third wheels, the frame structure including a principal longitudinal frame member and a principal rear support member that extends substantially outwardly from the frame member to the second and third wheels, wherein, during use, the rear support member is non-movably coupled to the frame member;
   a human support platform provided with and extending above the rear support member, the human support platform being positioned, at least in part, equidistant from the second and third wheels; and
   a steering mechanism that has a vertically ascending control member and is coupled to the first wheel such that a turning of the steering mechanism achieves a turning of the first wheel;
   wherein the biased direction wheel arrangements include at least one of:
      tilted caster wheel arrangement, and
      spring biased caster wheel arrangement.

17. The device of claim 16, wherein the rear support member has a substantially linear or curvilinear shape.

18. The device of claim 17, wherein the steering mechanism and first wheel are arranged such that for steering purposes there is a singular front wheel which is the first wheel.

19. The scooter device of claim 16, wherein the first wheel is larger than the second or third wheel.

* * * * *